United States Patent [19]
Beauchet

[11] 3,748,935
[45] July 31, 1973

[54] TUBE CUTTING DEVICES, NOTABLY FOR AUTOMATIC LATHES

[75] Inventor: Jean Beauchet, Annecy, France

[73] Assignee: Societe Norwelle de Roulements, Annecy, France

[22] Filed: May 28, 1971

[21] Appl. No.: 147,841

[30] Foreign Application Priority Data

June 4, 1970   France ........................... 7020481

[52] U.S. Cl. ........................... 82/70.1 R, 82/101 R
[51] Int. Cl. ........................... B23b 3/04, B23b 5/14
[58] Field of Search ................... 82/46, 47, 48, 70.1, 82/70.2, 71, 72, 73, 74, 75, 76, 77, 78, 82, 81, 92, 93, 94, 95, 96, 97, 101, 4 C

[56] References Cited
UNITED STATES PATENTS

| | | | |
|---|---|---|---|
| 2,561,035 | 7/1951 | Robichaud | 82/81 |
| 1,458,428 | 6/1923 | Mallberg | 82/92 |
| 1,864,903 | 6/1932 | Gora | 82/81 |
| 3,598,005 | 8/1971 | Shafer | 82/70.1 |
| 1,124,784 | 1/1915 | Monro | 82/92 |
| 1,372,127 | 3/1921 | Faunce | 82/92 |
| 1,806,475 | 5/1931 | Lee | 82/72 |
| 2,395,200 | 2/1946 | Smiley | 82/76 |
| 3,566,503 | 3/1971 | Pacak | 82/101 |
| 426,171 | 4/1890 | Comstock | 82/4 C |
| 3,173,318 | 3/1965 | Lindemann | 82/47 |

FOREIGN PATENTS OR APPLICATIONS

| | | | |
|---|---|---|---|
| 193,269 | 5/1967 | U.S.S.R. | 82/70.1 |
| 10,179 | 4/1909 | Great Britain | 82/92 |

*Primary Examiner*—Harrison L. Hinson
*Attorney*—Stevens, Davis, Miller & Mosher

[57] ABSTRACT

Device for cutting tubular pieces by means of cutting-wheels, characterized in that two cutting-wheels are disposed symmetrically on either side of the piece to be cut, a pair of lever arms each supporting one of said cutting-wheels being pivoted separately to a shaft rigid with the frame structure of a machine, and that common pressure means acting directly on said lever arms are provided for causing said cutting-wheels to penetrate into the piece to be cut while mutually compensating the pressure reactions of said wheels.

9 Claims, 5 Drawing Figures

FIG_1

FIG_2

TUBE CUTTING DEVICES, NOTABLY FOR AUTOMATIC LATHES

The present invention relates to cutting devices adaptable to automatic lathes of the single-spindle or multiple-spindle type for isostatically cutting tubular workpieces or the like without removing metal chips therefrom.

It is known to cut for example tubes into sections on a lathe without producing chips, by using a cutting-wheel adapted to revolve freely on a shaft and fed towards the tube axis while the tube itself is being rotatably driven by a spindle.

As a rule, this operation is carried out by mounting the cutting-wheel carrier or holder on one of the turrets or like movable element of the lathe on which the cutting operation is to be carried out. Desiredly, a second cutting-wheel may be disposed opposite said cutting-wheel for acting either likewise or performing a pre-cutting operation, or alternately supporting the tube during the cutting thereof by the first wheel. This second wheel may be mounted on another turret or tool-carriage of the lathe.

The essential inconvenience characterizing devices operating according to this general principle is that when it is desired to cut sections or parts from steel stock of relatively high strength the effort to be exerted for causing the cutting-wheels to penetrate into the metal is relatively considerable and therefore the tool-carriages and slideways must be strong enough to withstand the resulting and corresponding reaction, thus making it necessary to provide sturdy and expensive machine-tools, especially if in addition a fully satisfactory guiding action is expected from said tool-carriages.

It is the chief object of the present invention to provide a wheel-type cutting device capable of operating at a relatively high speed and free of the inconveniences mentioned hereinabove. This device is characterized in that it comprises a pair of cutting-wheels disposed symmetrically on either side of the piece, tube or like member to be cut, two lever arms each having one of said cutting-wheel rotatably supported thereon being pivoted about spaced pivot means rigid with a frame structure, and common pressure means acting directly upon said lever arms for causing said cutting-wheels to penetrate into the workpiece so as to balance or compensate automatically the pressure reactions of said cutting-wheels.

Other details and features characterizing this invention will appear as the following description proceeds with reference to the attached drawing illustrating diagrammatically by way of example typical forms of embodiment of the tube cutting device of this invention.

Figure 1:
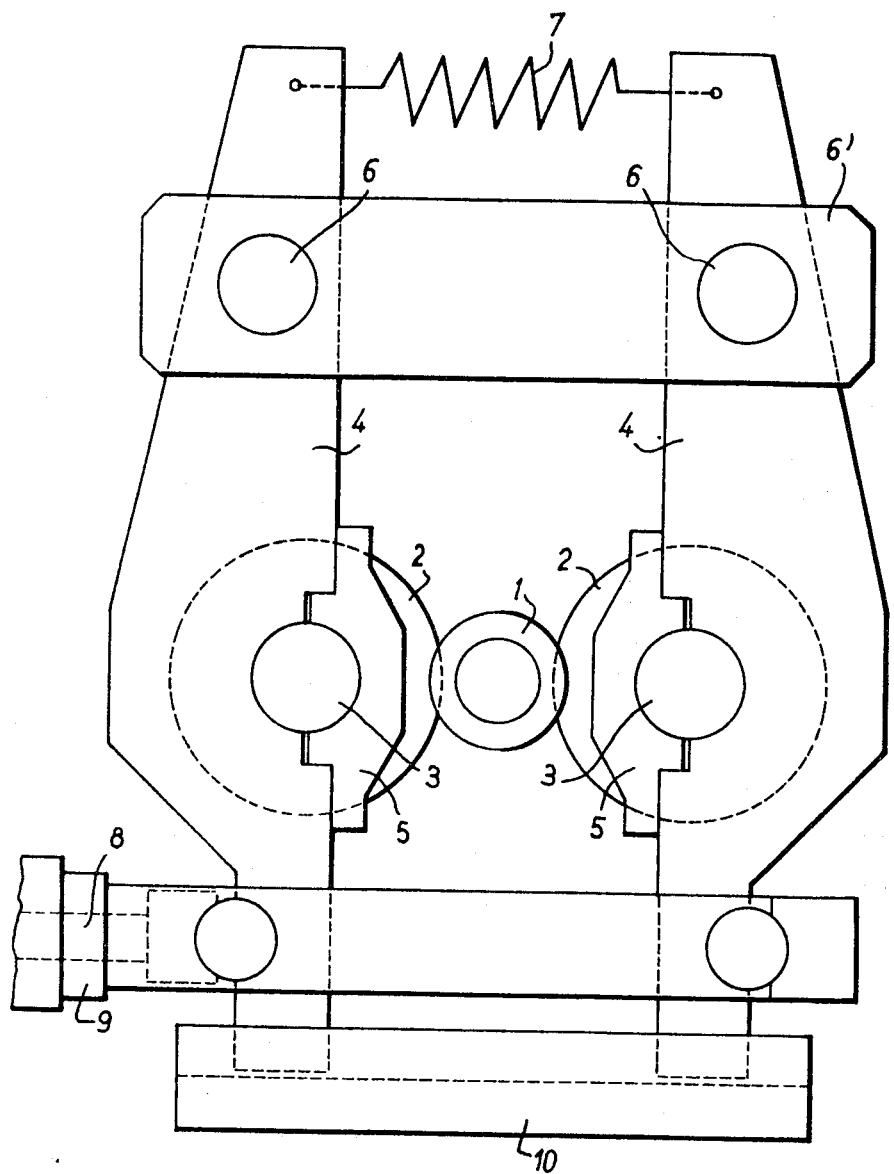
FIG. 1 is an elevational view of a cutting device wherein the penetration effort applied to the cutting-wheels is exerted by a hydraulic piston and cylinder set acting at the same time as a means for interconnecting the twin tools, the pivot points of the two arms being stationary.

Referring first to FIG. 1, a tube 1 is rotatably driven from the spindle of a lathe. A pair of cutting-wheels 2 are mounted for free rotation on corresponding parallel shafts 3 secured in cavities of a pair of registering arms 4 by means of caps 5. The arms 4 are adapted to pivot about fixed shafts 6 rigid with a frame structure 6' and in the inoperative position they are kept somewhat spaced from the tube 1 by a spring 7 or any other suitable device capable of performing the same function.

The necessary penetration effort is provided by a hydraulic piston and cylinder set of the "floating" type, so disposed that as the piston rod 8 pushes one arm 4 the cylinder 9 pulls the opposite arm. Under these conditions it is clear that the complete device is self-centering in relation to the tube 1 and the action performed by the pair of cutting-wheels 2 are mutually balanced. On the other hand, the reactions will be absorbed through the arms 4 by the rigid and fixed shafts 6. A suitable slideway 10 may be provided for guiding the lower ends of arms 4.

Figure 2:
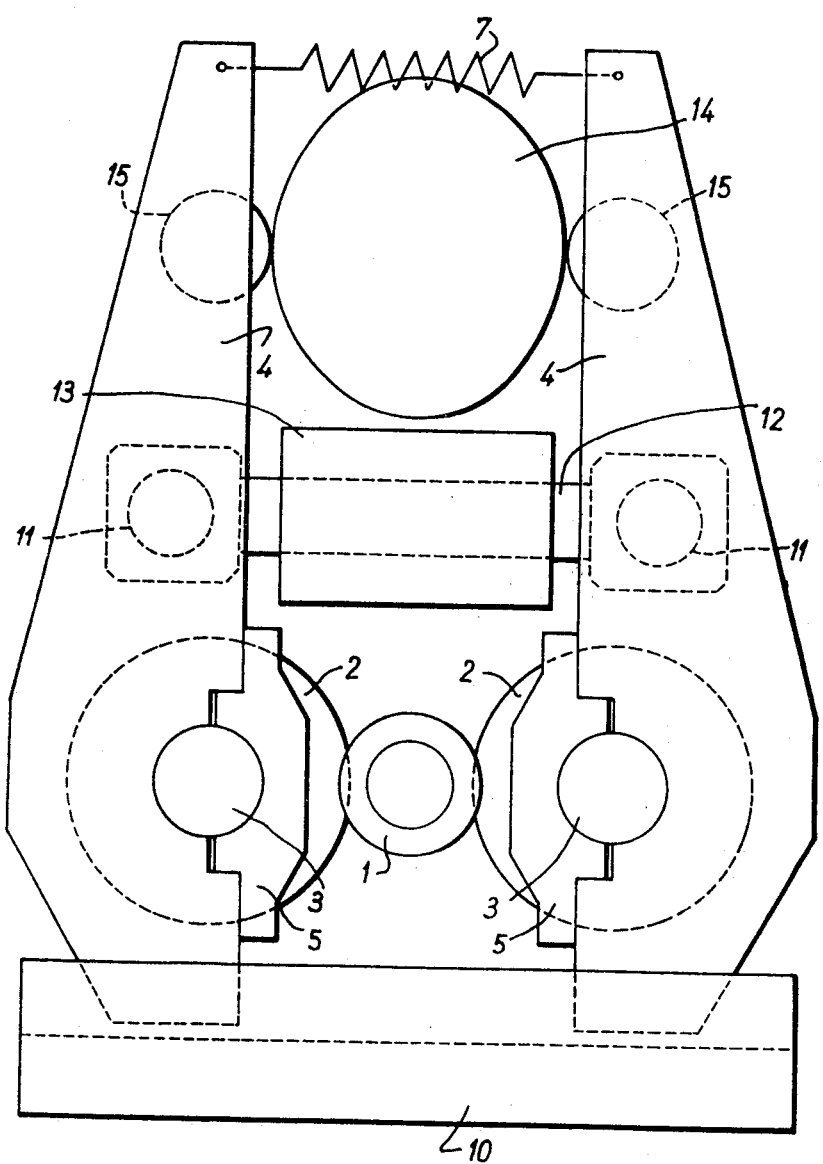
FIG. 2 illustrates in elevational view another device wherein the effort applied to the cutting-wheels is exerted by means of a cam, the pivots of the two arms being interconnected in a manner permitting of compensating the stress in the assembly.

The relative spacing of the two cutting-wheels may easily be adjusted by means of end stops secured to the slideway 10. In the modified structure illustrated in FIG. 2 the tools operate in a similar fashion but the penetration or cutting effort is exerted through the medium of a cam 14 acting upon rollers 15 rigid with the wheel carrier arms 4. In this case the arms 4 pivot about shafts 11 interconnected by a member 12 supported by a block 13 in which it can slide freely.

Thus, this device, like the preceding one, is self-centering in relation to the tube 1 and therefore the actions exerted by the cutting-wheels 2 can balance each other. The complete device is suported by the slideway block 13 and the reactions are absorbed by the cam 14.

The relative spacing of the cutting-wheels 2 is adjusted by properly controlling the rollers 15, the value of the working stroke depending on the contour of cam 14.

In the above-described devices the cutting-wheels must be mounted to permit their free lateral movements for, due to the fact that they operate by pressure, the metal is driven by the faces of the wheel, and besides since the tube is fixed in the lathe spindle, the cutting-wheel must be adapted to follow the movements of its free end.

On the other hand, the tools may have any suitable and desired shape while constituting circular cutting-wheels revolving freely about a shaft and free to travel in a direction parallel to the tube axis. The permissible movement may be either that of the cutting-wheel about its axis or that of the complete wheel-and-shaft assembly in its cavity, or alternately that of the complete cutting assembly slidably mounted in relation to the lathe spindle.

Figure 3:
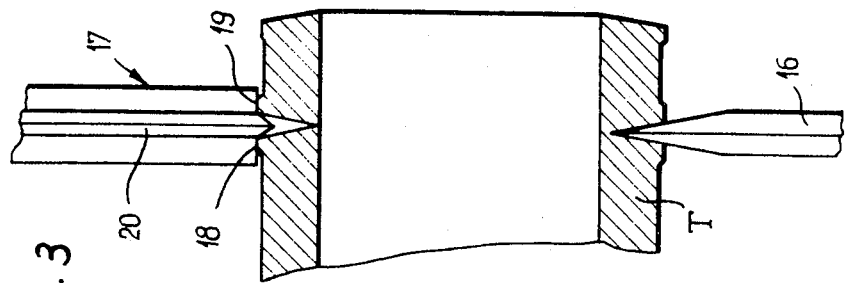
FIG. 3 illustrates a device for upsetting the burrs resulting from the cutting operation by means of one of the cutting wheels.

In FIG. 3, a device of a type already described hereinabove, as far as its portion not illustrated therein is concerned, comprises a cutting-wheel 16 of which the faces adjacent the cutting edge form a very sharp angle in order to limit the effort necessary for causing its penetration into the tube T to be cut, and another cutting-wheel 17 of which the outer periphery comprises a pair of cylindrical portions forming shoulders 18 and 19 on either side of a cutting edge 20, the thickness of said shoulders 18 and 19 being inferior to that of the opposite wheel 16 so as to assist in properly centering the second wheel 17 with respect to the cut formed by the first cutting-wheel 16. Thus, as burrs are formed as a consequence of the cutting action of wheel 16, they are upset by the other wheel 17. Consequently, the workpiece thus obtained has a substantially cylindrical and smooth outer diameter and may subsequently be processed through any other conventional means for performing other machining operations.

Figure 4:
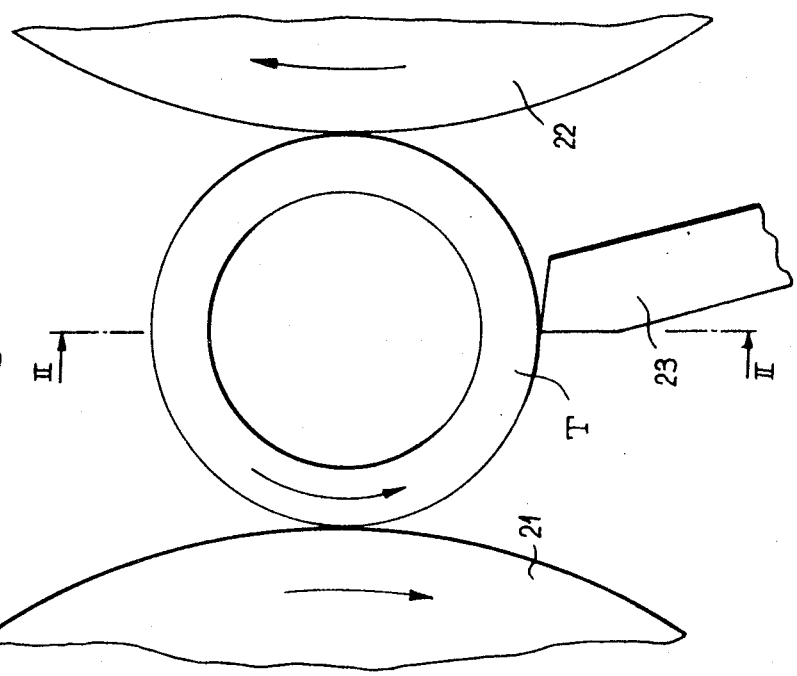
FIG. 4 is a front view showing diagrammatically a burr upsetting device.
Figure 5:
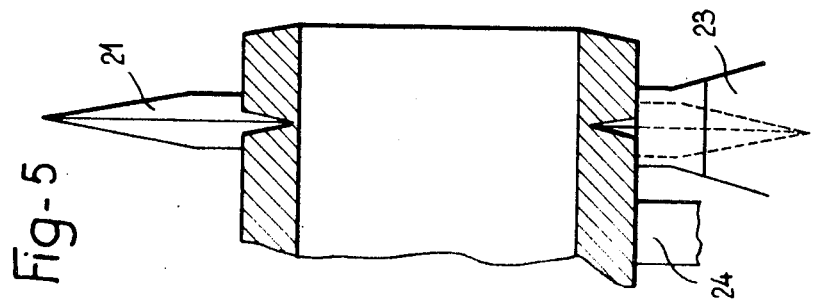
FIG. 5 is a longitudinal section showing the device of FIG. 4, along IV—IV.

Referring now to FIGS. 4 and 5, a cutting device of the type already described as far as its portion not shown therein is concerned, comprises a pair of identical cutting-wheels wherein the angle formed by their faces adjacent the cutting edge is extremely sharp in order to limit the penetration efforts.

In a plane perpendicular to the plane containing the axes of the wheels 21 and 22 a tool 23 is so disposed that it approaches as close as possible the workpiece or tube T. A stop 24 is disposed slightly ahead of the tool, in the direction of feed or translation of the tube T to be cut, to prevent any damage to the tool during the successive movements of the tube.

As burrs develop on the tube T as a consequence of the cutting action of cutting-wheels 21 and 22, they are removed or upset by said tool 23. Thus, as in the case of the device illustrated in FIG. 3, the cut piece has a clean cylindrical external configuration.

Of course, this invention should not be construed as being strictly limited by the specific forms of embodiment described and illustrated herein, since various modifications may be brought thereto without departing from the spirit and scope of the invention as set forth in the appended claims.

What is claimed as new is :

1. A device for cutting a tubular piece rotatably driven about its axis, comprising a frame structure, a pair of upright lever arms pivotally mounted on said frame structure, a cutting wheel mounted on each of said lever arms, said wheels being symmetrically facing each other on said lever arms, spring means interconnecting said levers to urge said cutting wheels to an outermost position, and common pressure means acting directly on said lever arms for causing said cutting wheels to penetrate into the piece to be cut on either side thereof, whereby the pressures exerted by said wheels on said piece to be cut are equal and in opposite directions.

2. A device according to claim 1, wherein said common pressure means consists of a fluid pressure piston-and-cylinder set.

3. A device according to claim 1, wherein said common pressure means consists of a cam co-acting with rollers rigid with said lever arms supporting said cutting-wheels.

4. A device according to claim 1, wherein a slideway is provided for guiding the lower portions of said lever arms.

5. A device according to claim 4, wherein limit stops are secured to said slideway to determine the relative spacing of said lever arms in said outermost position.

6. A device according to claim 1, wherein said cutting-wheels are freely movable in a direction parallel to the longitudinal axis of the piece to be cut.

7. Device according to claim 1, wherein characterized in that one of said cutting-wheels comprises a cutting edge thinner than that of the other cutting-wheel, and on either side of said cutting edge a shoulder shaped to correct the distortions produced in the piece as a consequence of the cutting thereof.

8. Device according to claim 1 a cutting tool is secured tangentially to the outer surface of the piece being cut, in the working plane of said cutting-wheels, said tool covering with it cutting edge the outer cylindrical surface of the piece which is distorted by the cutting process, so as to upset these distortions as the cutting operation proceeds.

9. A device according to claim 1, wherein said frame structure is freely mounted transversely to said tubular piece to be cut.

* * * * *